United States Patent [19]

Alavoine et al.

[11] 4,456,205

[45] Jun. 26, 1984

[54] AIRCRAFT ARRESTING GEAR NET RAISING DEVICE

[75] Inventors: Jacques J. Alavoine, Domont; Claude Contensou, Paris; Pierre M. Hardy, Courbevoie; Francis H. Neveux, Chatillon, all of France

[73] Assignee: Aerazur EFA, France

[21] Appl. No.: 455,077

[22] Filed: Jan. 3, 1983

Related U.S. Application Data

[63] Continuation-in-part of Ser. No. 176,429, Aug. 8, 1980, abandoned.

[30] Foreign Application Priority Data

Aug. 9, 1979 [FR] France ............................. 79 20397

[51] Int. Cl.³ .............................................. B64F 1/02
[52] U.S. Cl. ............................. 244/110 C; 244/110 F
[58] Field of Search ........... 244/110 R, 110 C, 110 F; 91/16 S, 216 R, 454; 92/134, 117 R, 117 A

[56] References Cited

U.S. PATENT DOCUMENTS

| | | | |
|---|---|---|---|
| 41,586 | 2/1864 | Wright | 92/117 A |
| 2,193,736 | 3/1940 | Onions | 92/134 |
| 2,550,373 | 4/1951 | Ortloff et al. | 92/117 R |
| 2,854,201 | 9/1958 | Cotton | 244/110 R |
| 2,919,871 | 1/1960 | Sorensen | 244/110 C |
| 2,933,069 | 4/1960 | Gratzmuller | 91/454 |
| 3,000,596 | 9/1961 | Puffe | 244/110 C |
| 3,367,608 | 2/1968 | Charno et al. | 244/110 C |
| 3,383,076 | 5/1968 | Van Zelm et al. | 244/110 C |
| 3,477,229 | 11/1969 | Katko | 92/117 R |
| 3,724,333 | 4/1973 | Fonden et al. | 244/110 F |
| 4,056,247 | 11/1977 | Bernard et al. | 244/110 C |

FOREIGN PATENT DOCUMENTS

| | | | |
|---|---|---|---|
| 1807788 | 2/1971 | Fed. Rep. of Germany | 92/134 |
| 99293 | 5/1875 | France | 92/216 R |

Primary Examiner—Galen L. Barefoot
Attorney, Agent, or Firm—William A. Drucker

[57] ABSTRACT

In this device for raising the net of an aircraft arresting gear, on either side of the runway is disposed a frame secured to the ground by means of ordinary anchorings and bearing a piston and cylinder ram which comprises a fixed piston rod and a cylinder body movable along a guiding path of the frame structure for actuating through push links a raising post pivoted by its base to the frame structure and obliquely disposed in relation to the runway axis. The pivot axis of the post is off set in relation to the post axis.

1 Claim, 7 Drawing Figures

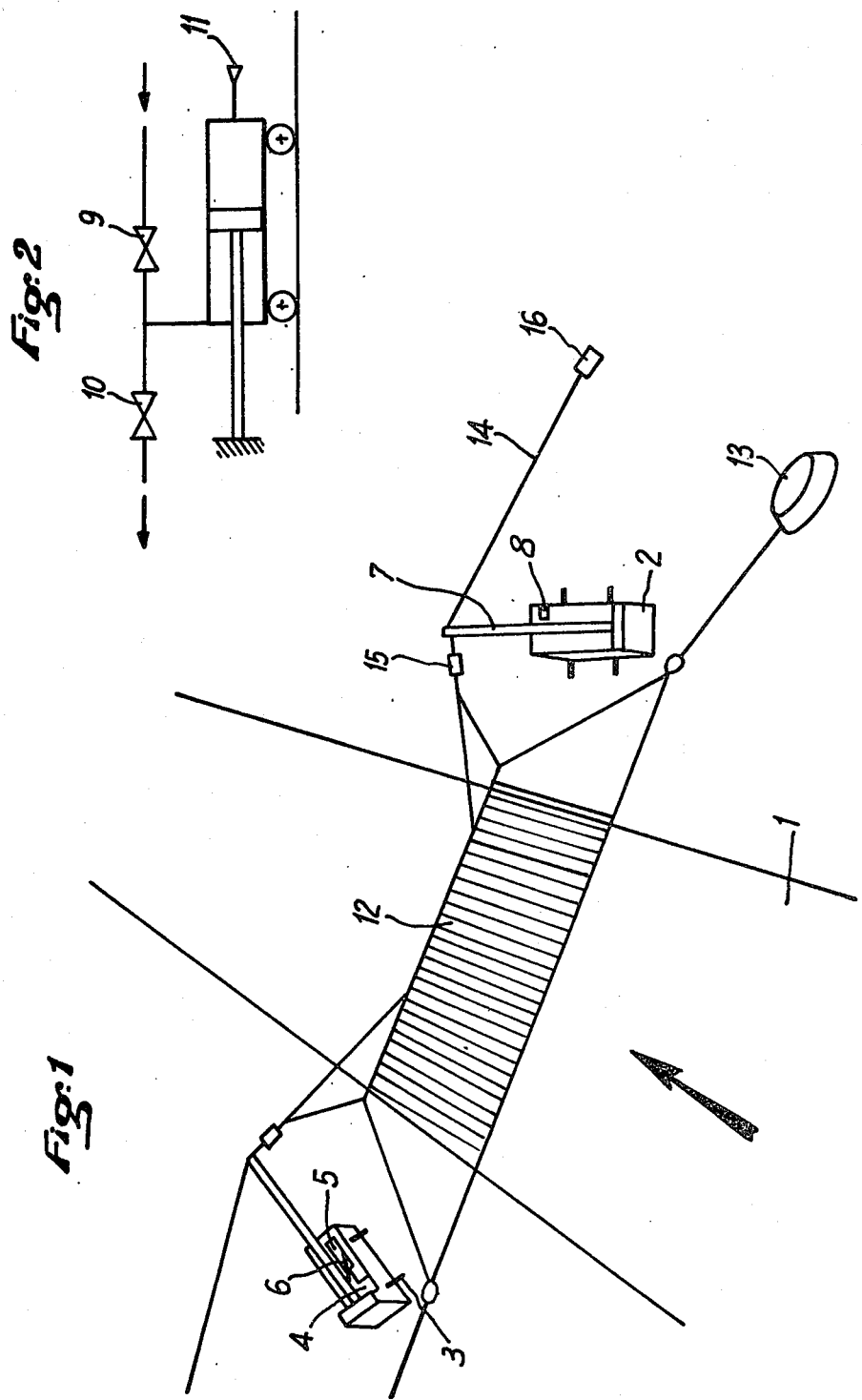

AIRCRAFT ARRESTING GEAR NET RAISING DEVICE

The present application is a continuation-in-part of our co-pending application Ser. No. 176,429 filed on Aug. 8, 1980, now abandoned.

BACKGROUND OF THE INVENTION

1. Field of the Invention

This invention concerns improvements relating to the operation of systems for raising net-type aircraft arresting gears.

At present, on take-off and landing strips or runways these arresting gears consist mainly of a net adapted to be raised in front of the aircraft in case of emergency, or alternatively of a cable extending across the strip in the case of aircrafts equipped with a special cross-head.

It is the essential object of the present invention to widen the field of possible uses for the net raising system proper.

2. Description of the Prior Art

The most popular systems employed for this purpose consist in raising a net disposed flat on the ground across the strip by means of posts driven in turn, either directly or through a cable, by a pneumatic or hydraulic cylinder controlled either from the control tower or from the barrier itself.

These devices generally consist of several independent elements, each submitted to high stresses. Their installation thus requires several supports accurately disposed the ones in relation with the other and adapted to absorb high stresses without any movement.

Moreover the lowering of the net is not positively ensured or, if yes, such lowering imposes a consumption of energy.

Furthermore, when the net is raised, holding the tension of the net suspension systematically involves a non-elastic deformation of this suspension and consequently a lowering of the net.

Finally the conceiving of these devices does not allow their complete housing into the ground for avoiding the presence of an obstacle at the strip end.

SUMMARY OF THE INVENTION

Consequently, in order to remove these inconveniences, the Inventors propose a raising system comprising a "working" frame and presenting a structural disposition and a generation of pneumatic or hydraulic pressure which allow to provide a compact unit adapted to be easily housed in the ground.

The use of a cylinder and piston unit with a fixed piston and a cylinder body movable along a guiding path, and of a cylindrical post of which the rotation axis is off set in relation to the post axis allows to obtain a very compact unit adapted to be housed on a frame of a sufficient reduced length to be of the "working" type i.e. a frame of which the reactions compensate the greatest part of the forces exerted on the raising members. Such a solution removes the necessity of installing an expensive concrete block under the device. Ordinary anchorings, removing the use of concrete, are thus sufficient to absorb the inversion torques.

It is thus possible to wholly house the device into the ground, thus avoiding obstacles at the strip end.

Furthermore, by using a cylinder and piston unit in which, during the post raising, one of the cylinder chamber is fed with fluid while the other chamber is closed, absorption of the post movement is obtained at the end of the raising operation thus allowing the energy in excess, stored within the closed chamber, to be used for urging the posts downwards when the net is to be lowered, such an action being essential when the wind blows. This solution avoids the installation of a remote-controlled circuit inflating the cylinder chamber which controls the lowering of the post and the corresponding energy consumption necessary for this phase of operation, that eventually allows to increase the autonomy of the device.

According to the foreseen use of the device and to the energy made necessary for raising the net, the cylinder is fed with hydraulic or pneumatic pressure.

Another advantage of the device according to the invention consists in that the post supporting frame is neither parallel nor perpendicular to the strip axis, but makes an angle of for example about 20° with said axis; that allows, during the raising movement, the post head to move apart from the strip axis and consequently to stretch the upper straps of the net. Furthermore, according to the invention, the closed chamber of the cylinder is provided with a valve adapted, after the raising of the net, to hold at an invariable value the counterpressure within this chamber, thus limiting a lowering of the upper part of the net entailed by a no-elastic deformation of the suspension.

BRIEF DESCRIPTION OF THE DRAWING

FIG. 1 is a perspective view of the arresting gear with the net thereof let flat on the ground or strip, before its raising;

FIG. 2 is a schematic view showing a piston and cylinder unit with its feed and emptying circuits;

DESCRIPTION OF THE PREFERRED EMBODIMENT

Figure 3:
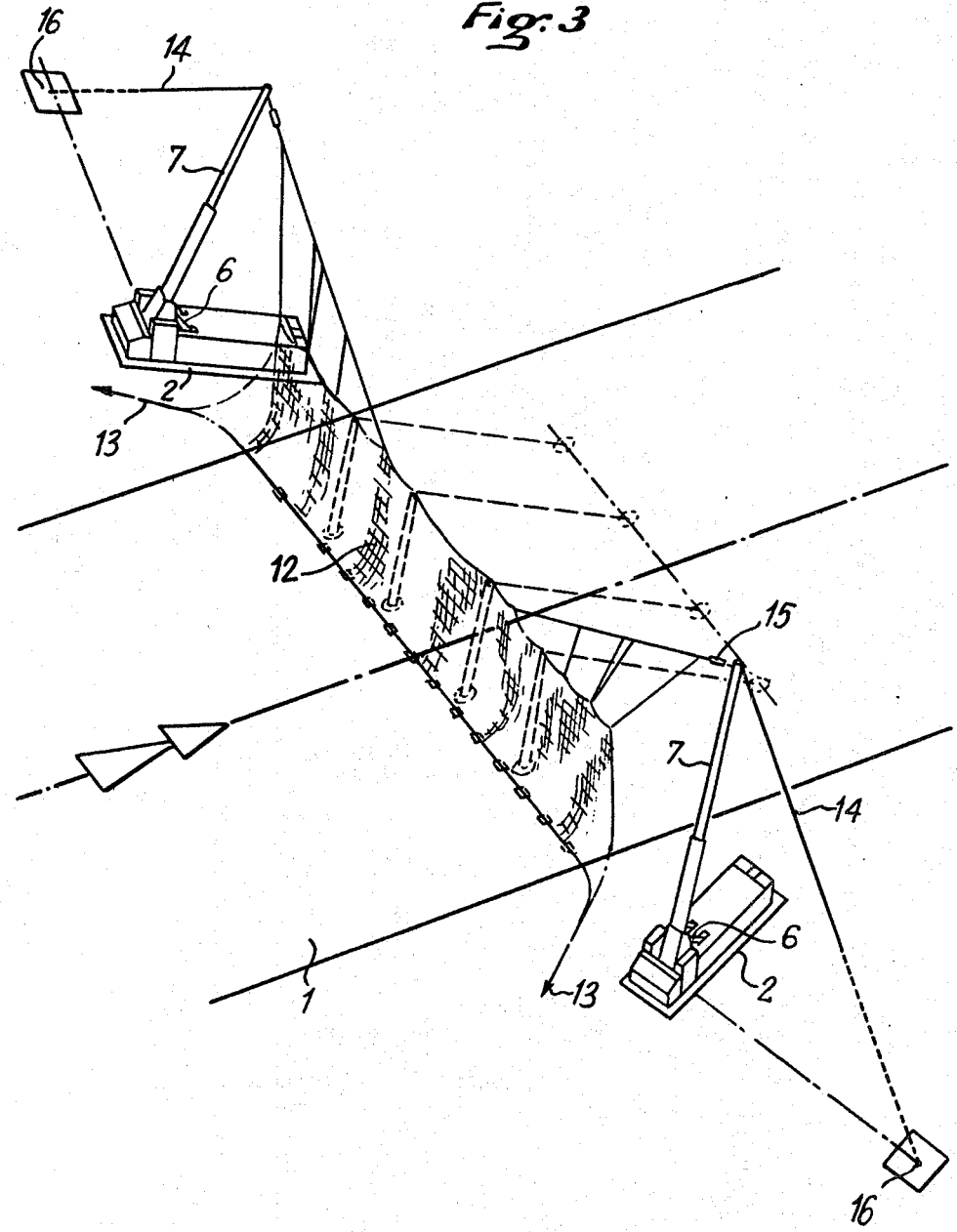
FIG. 3 is a perspective view of the arresting gear showing the net in its raised position.

In the specific form of embodiment illustrated in the drawing the raising device for an aircraft arresting gear according to this invention comprises, on either side of the take-off or landing strip 1, a frame structure 2 secured to the ground by means of ordinary anchorings 3 carrying the generation of pneumatic or hydraulic pressure 4, the cylinder and piston unit 5, the push links 6, the raising post 7 and a remote-controlled locking system 8 with its auxiliary reciprocable ram.

The circuit for generating the pneumatic pressure mainly comprises (see FIG. 2) the raising solenoid valve 9, the emptying and lowering solenoid valve 10 and the valve 11.

On either side of the strip the net 12 constituting the arresting element proper of the gear is attached on the one hand to a brake 13 and has on the other hand its upper portion secured to a rope 14 via a release device 15. This rope 14 extends freely through the post top and has its outer end secured to the ground by means of an anchoring 16.

Figure 4:
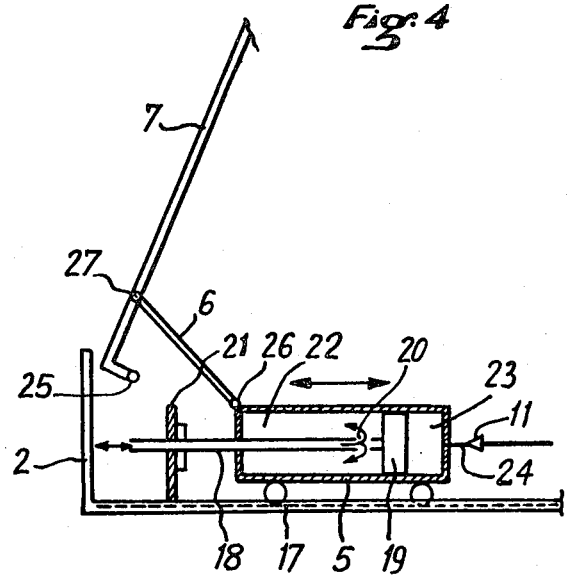
FIGS. 4 and 5 are side views showing a post of the arresting gear respectively in a raised and a lowered position.
Figure 5:
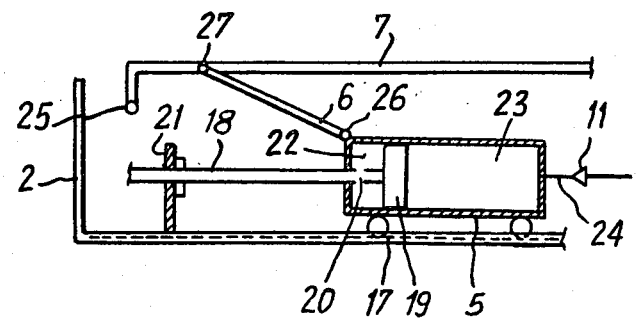

FIGS. 4 and 5 more particularly show a push link 6 which is pivoted at one end 26 to the cylinder 5 and at the other end to an intermediate point 27 of post 7. As shown, the rotation axis 25 of the post 7 is offset in relation to the post axis, that allows an increase lever arm facilitating the beginning of the raising movement of the post and thus reducing the time necessary to raise the net. The movement of the cylinder 5 along the guide tracks 17 of the frame 2 causes, through the push link 6, the post 7 to rotate about the axis 25 for its raising or its lowering.

Figure 6:
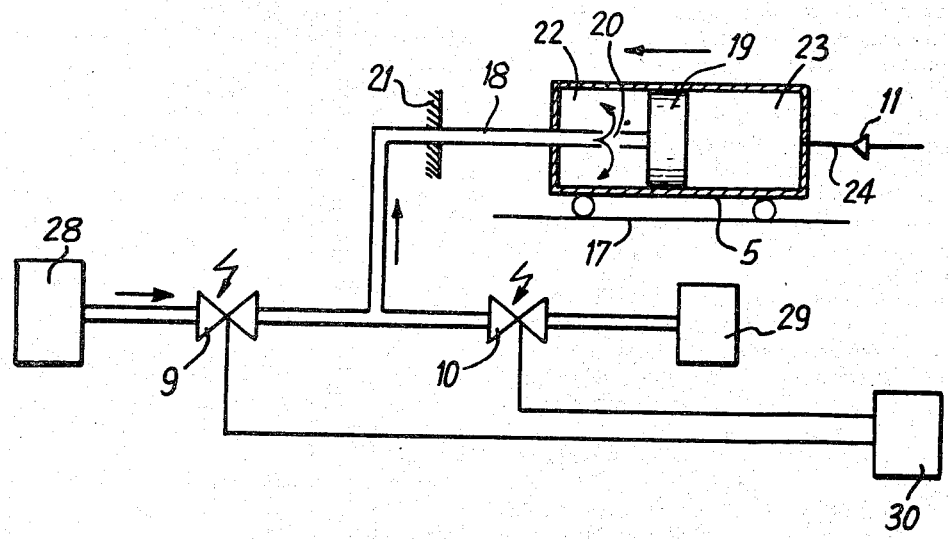
FIGS. 6 and 7 are diagrammatic side views showing respectively the movement of the cylinder controlling the raising and the lowering of the post.
Figure 7:
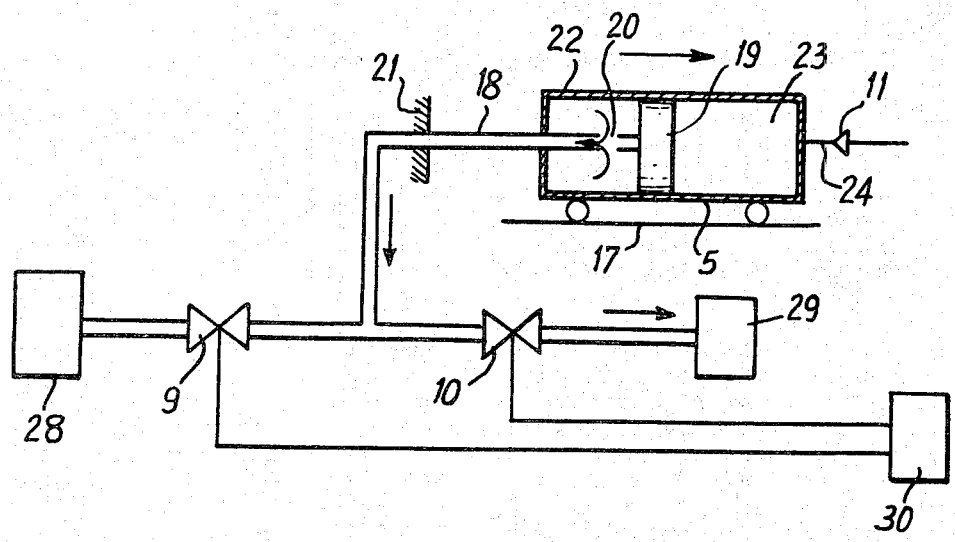

As shown at FIGS. 6 and 7, the open chamber 22 of cylinder 5 is fed with pneumatic fluid through holes 20 provided in the hollow rod 18 of piston 19 which is carried by a fixed support 21 and is connected to ducts leading to a source 28 of pneumatic pressure and to a tank 29. The solenoid valves 9 and 10 are respectively disposed on these two ducts and are electrically controlled from a control box 30.

In the following will mainly be described the operation of the mechanical part of the device, which constitutes the subject-matter of the invention.

The compressed gas feeding system as well as the electric control system acting on the solenoide valves 9–10 are not original per se and consequently are not fully explained hereafter. It is only precised that the electric control members are enclosed in a small cabinet (not shown) located in the vicinity of the arresting gear and that a switch board disposed in the control tower allows to remote-control the raising and lowering of the net.

When the raising of the net is ordered from the control tower or from the cabinet located in the vicinity of the arresting gear, the solenoid valve 9 opens to feed with gas under pressure, through piston rod 18, the cylinder chamber 22 located around the piston rod while the emptying solenoid valve 10 shuts. Consequently the cylinder body moves (towards the left of FIG. 6) along its guiding path 17 and drives the push links 6 and the post 7 in their position shown at FIG. 4. This movement of the cylinder body entails an increase of the gas pressure within the closed chamber 23 of the cylinder absorbing the post movement at the end of the raising operation. In case of using a hydraulic fluid, gas is thus replaced by oil and a hydro-pneumatic accumulator must be placed on the side of the closed chamber 23.

If the net stays in its raised position for a time sufficiently long to involve a non-elastic deformation of the net suspension, the balance position of the unit constituted by the cylinder 5, the push links 6 and the post 7 is modified. The volumes of the feed circuit and of the closed chamber 23 rapidly increase while the feed pressure stays practically invariable. That results in a stretching fall in the suspension and consequently in a lowering of the upper part of the net. To remove this inconvenience, a valve 11 is disposed in the circuit 24 of the closed chamber 23 and is adjusted to a suitable level allowing, after the net raising, the gas pressure within the closed chamber 23 to be hold at an invariable value.

When the lowering of the net is ordered, the solenoid valve 9 closes while the solenoid valve 10 opens, which is equipped with a discharge limiting device in order to adjust the duration of the lowering operation. The emptying of the cylinder chamber 22 located on the piston rod side causes the gas pressure within the closed chamber 23 to decrease that urges the net to its lowering position if such a lowering under the action of the net weight is opposed by a sufficient wind.

Of course, this invention should not be construed as being strictly limited by the specific form of embodiment shown and described herein, since various modifications and variations may be brought thereto without departing from the basic principles of the invention as set forth in the appended claims.

What we claim is:

1. An aircraft arresting gear, for disposal across a runway having a center line, comprising:
    (a) a pair of frame structures having a first end and a second end, said frame structures being disposed on the ground one at each side of the runway and obliquely to the center line of the runway,
    (b) anchoring means associated with said frame structures for the anchoring thereof to the ground,
    (c) a pair of posts, one secured to each of said frame structures, said posts each having a top end and a bottom end, and pivot means pivoting each post at its bottom end, said pivot means being offset in relation to the longitudinal axis of the associated post,
    (d) a rope connected to the top end of each post and disposed across the runway,
    (e) a net disposed across the runway and connected to said rope,
    (f) a pair of piston and cylinder rams associated one with each of said frame structures, the piston rod of each said ram being secured to the associated frame structure,
    (g) push links pivotally connected at one end to the ram cylinder and at the opposite end to the associated post,
    (h) guiding tracks provided on each frame structure for guiding the movement of the associated ram cylinder,
    (i) a first circuit connecting a chamber of the ram cylinder located around the piston rod to means for feeding one of hydraulic and pneumatic fluid,
    (j) a raising solenoid valve disposed on said first circuit to control the feeding of said cylinder chamber located around the piston rod,
    (k) a second circuit connecting said cylinder chamber located around the piston rod to an emptying tank,
    (l) a lowering solenoid valve disposed on said second circuit to control the emptying of said cylinder chamber located around the piston rod, and
    (m) a closed chamber of the ram cylinder, opposite said chamber located around the piston rod, said closed chamber being equipped with a valve adjusted to hold at an invariable value the pressure within said closed chamber, thus avoiding a lowering of the upper portion of the net involved by a non-elastic deformation of suspension members.

* * * * *